(12) United States Patent
Seymour

(10) Patent No.: US 8,120,547 B2
(45) Date of Patent: Feb. 21, 2012

(54) INFORMATION DISPLAY

(75) Inventor: Bruce David Seymour, Plainville, CT (US)

(73) Assignee: Puredepth Limited, Auckland (NZ)

( * ) Notice: Subject to any disclaimer, the term of this patent is extended or adjusted under 35 U.S.C. 154(b) by 0 days.

(21) Appl. No.: 10/476,590

(22) PCT Filed: May 1, 2002

(86) PCT No.: PCT/NZ02/00079
§ 371 (c)(1),
(2), (4) Date: Jul. 28, 2004

(87) PCT Pub. No.: WO02/089102
PCT Pub. Date: Nov. 7, 2002

(65) Prior Publication Data
US 2004/0239582 A1   Dec. 2, 2004

(30) Foreign Application Priority Data

May 1, 2001   (NZ) .......................................... 511444

(51) Int. Cl.
*G09G 5/00*   (2006.01)
(52) U.S. Cl. ............................. 345/4; 345/204; 345/1.1
(58) Field of Classification Search ................... 345/1.1, 345/4–9, 87, 55, 156, 168, 169, 204
See application file for complete search history.

(56) References Cited

U.S. PATENT DOCUMENTS

| | | |
|---|---|---|
| 3,863,246 A | 1/1975 | Trcka et al. |
| 4,239,349 A | 12/1980 | Scheffer |
| 4,294,516 A | 10/1981 | Brooks |
| 4,333,715 A | 6/1982 | Brooks |
| 4,371,870 A | 2/1983 | Biferno |
| 4,423,929 A | 1/1984 | Gomi |
| 4,443,062 A | 4/1984 | Togashi et al. |
| 4,472,737 A | 9/1984 | Iwasaki |
| 4,485,376 A | 11/1984 | Noble |
| 4,523,848 A | 6/1985 | Gorman et al. |
| 4,556,286 A | 12/1985 | Uchida et al. |
| 4,562,433 A * | 12/1985 | Biferno ............................. 345/4 |
| 4,568,928 A | 2/1986 | Biferno |
| 4,648,691 A | 3/1987 | Oguchi |
| 4,649,425 A | 3/1987 | Pund |
| 4,712,869 A | 12/1987 | Claxton |
| 4,768,300 A | 9/1988 | Rutili |
| 4,815,742 A | 3/1989 | Augustine |
| 4,927,240 A | 5/1990 | Stolov et al. |
| 4,947,257 A | 8/1990 | Fernandez et al. |

(Continued)

FOREIGN PATENT DOCUMENTS

AU   24806/00   7/2000

(Continued)

OTHER PUBLICATIONS

Office Action U.S. Appl. No. 10/048,638; Mail Date Jun. 6, 2008.

(Continued)

*Primary Examiner* — Stephen G Sherman

(57) ABSTRACT

A method displaying information for viewing by a user characterised by the steps of: peripherally displaying primary information (5) on a first focal plane (3), and displaying secondary information (6) on at least a second focal plane (2) to said primary information (5), wherein said secondary information (6) exhibits at least one characteristic capable of augmenting the effect of the primary information (5) on the viewer.

30 Claims, 3 Drawing Sheets

U.S. PATENT DOCUMENTS

| | | | |
|---|---|---|---|
| 5,049,870 A | 9/1991 | Fitzgerald et al. | |
| 5,050,965 A | 9/1991 | Conner et al. | |
| 5,091,720 A | 2/1992 | Wood | |
| 5,112,121 A | 5/1992 | Chang et al. | |
| 5,113,272 A | 5/1992 | Reamey | |
| 5,124,803 A | 6/1992 | Troxel | |
| 5,198,936 A | 3/1993 | Stringfellow | |
| 5,255,028 A | 10/1993 | Biles | |
| 5,255,356 A | 10/1993 | Michelman et al. | |
| 5,283,560 A | 2/1994 | Bartlett | |
| 5,289,297 A | 2/1994 | Bollman et al. | |
| 5,317,686 A | 5/1994 | Salas et al. | |
| 5,333,255 A | 7/1994 | Damouth | |
| 5,361,165 A | 11/1994 | Stringfellow | |
| 5,367,801 A | 11/1994 | Ahn | |
| 5,396,429 A * | 3/1995 | Hanchett | 701/117 |
| 5,416,890 A | 5/1995 | Beretta | |
| 5,416,895 A | 5/1995 | Anderson et al. | |
| 5,418,898 A | 5/1995 | Zand et al. | |
| 5,463,724 A | 10/1995 | Anderson et al. | |
| 5,465,101 A | 11/1995 | Akiba et al. | |
| 5,473,344 A | 12/1995 | Bacon et al. | |
| 5,475,812 A | 12/1995 | Corona et al. | |
| 5,479,185 A | 12/1995 | Biverot | |
| 5,502,805 A | 3/1996 | Anderson et al. | |
| 5,585,821 A | 12/1996 | Ishikura et al. | |
| 5,590,259 A | 12/1996 | Anderson et al. | |
| 5,600,462 A | 2/1997 | Suzuki | |
| 5,600,765 A | 2/1997 | Ando et al. | |
| 5,604,854 A | 2/1997 | Glassey | |
| 5,623,591 A | 4/1997 | Cseri | |
| 5,638,501 A | 6/1997 | Gough et al. | |
| 5,648,789 A * | 7/1997 | Beadles et al. | 345/8 |
| 5,651,107 A | 7/1997 | Frank et al. | |
| 5,663,746 A | 9/1997 | Pellenberg et al. | |
| 5,664,127 A * | 9/1997 | Anderson et al. | 715/776 |
| 5,675,755 A | 10/1997 | Trueblood | |
| 5,694,150 A | 12/1997 | Sigona et al. | |
| 5,694,532 A * | 12/1997 | Carey et al. | 345/419 |
| 5,695,346 A | 12/1997 | Sekiguchi et al. | |
| 5,721,847 A | 2/1998 | Johnson | |
| 5,729,219 A | 3/1998 | Armstrong et al. | |
| 5,757,522 A | 5/1998 | Kulick et al. | |
| 5,764,317 A | 6/1998 | Sadovnik et al. | |
| 5,772,446 A * | 6/1998 | Rosen | 434/307 R |
| 5,796,455 A | 8/1998 | Mizobata | |
| 5,805,163 A | 9/1998 | Bagnas | |
| 5,805,171 A | 9/1998 | St. Clair et al. | |
| 5,813,742 A | 9/1998 | Gold et al. | |
| 5,825,436 A | 10/1998 | Knight | |
| 5,828,420 A | 10/1998 | Marshall et al. | |
| 5,831,615 A | 11/1998 | Drews et al. | |
| 5,835,088 A | 11/1998 | Jaaskelainen, Jr. | |
| 5,880,742 A | 3/1999 | Rao et al. | |
| 5,883,623 A | 3/1999 | Cseri | |
| 5,883,627 A | 3/1999 | Pleyer | |
| 5,883,635 A | 3/1999 | Rao et al. | |
| 5,890,174 A | 3/1999 | Khanna et al. | |
| 5,923,307 A | 7/1999 | Hogle, IV | |
| 5,924,870 A | 7/1999 | Brosh et al. | |
| 5,963,197 A | 10/1999 | Bacon et al. | |
| 5,999,191 A | 12/1999 | Frank et al. | |
| 6,005,654 A | 12/1999 | Kipfer et al. | |
| 6,016,385 A | 1/2000 | Yee et al. | |
| 6,018,379 A | 1/2000 | Mizobata | |
| 6,031,530 A | 2/2000 | Trueblood | |
| 6,037,937 A | 3/2000 | Beaton et al. | |
| 6,057,814 A | 5/2000 | Kalt | |
| 6,061,110 A | 5/2000 | Hisatake | |
| 6,072,489 A | 6/2000 | Gough et al. | |
| 6,075,531 A | 6/2000 | DeStefano | |
| 6,085,202 A | 7/2000 | Rao et al. | |
| 6,097,361 A | 8/2000 | Rohner | |
| 6,100,862 A | 8/2000 | Sullivan | |
| 6,111,614 A | 8/2000 | Mugura et al. | |
| 6,118,427 A | 9/2000 | Buxton et al. | |
| 6,163,318 A | 12/2000 | Fukunda et al. | |
| 6,181,349 B1 | 1/2001 | Bardon et al. | |
| 6,204,902 B1 | 3/2001 | Kim | |
| 6,215,490 B1 | 4/2001 | Kaply | |
| 6,215,898 B1 | 4/2001 | Woodfill et al. | |
| 6,239,852 B1 | 5/2001 | Oono | |
| 6,246,407 B1 | 6/2001 | Wilks et al. | |
| 6,269,173 B1 | 7/2001 | Hsien | |
| 6,282,551 B1 | 8/2001 | Anderson et al. | |
| 6,300,990 B1 | 10/2001 | Yamaguchi | |
| 6,317,128 B1 | 11/2001 | Harrison et al. | |
| 6,327,592 B1 | 12/2001 | Yoshikawa | |
| 6,341,439 B1 | 1/2002 | Lennerstad | |
| 6,351,298 B1 | 2/2002 | Mitsui | |
| 6,356,281 B1 | 3/2002 | Isenman | |
| 6,369,830 B1 | 4/2002 | Brunner et al. | |
| 6,377,229 B1 | 4/2002 | Sullivan | |
| 6,418,426 B1 | 7/2002 | Schlesinger | |
| 6,438,515 B1 | 8/2002 | Crawford et al. | |
| 6,443,579 B1 | 9/2002 | Myers | |
| 6,466,185 B2 | 10/2002 | Sullivan et al. | |
| 6,468,157 B1 | 10/2002 | Hinami et al. | |
| 6,496,832 B2 | 12/2002 | Chi et al. | |
| 6,505,209 B1 | 1/2003 | Gould et al. | |
| 6,525,699 B1 | 2/2003 | Suyama et al. | |
| 6,538,660 B1 | 3/2003 | Celi, Jr. et al. | |
| 6,587,094 B2 | 7/2003 | Anderson | |
| 6,587,118 B1 | 7/2003 | Yoneda | |
| 6,593,904 B1 | 7/2003 | Marz et al. | |
| 6,609,799 B1 | 8/2003 | Myers | |
| 6,610,102 B1 | 8/2003 | Aldred et al. | |
| 6,661,425 B1 * | 12/2003 | Hiroaki | 345/629 |
| 6,693,692 B1 | 2/2004 | Kaneko | |
| 6,721,713 B1 | 4/2004 | Guheen et al. | |
| 6,725,422 B1 | 4/2004 | Bauchot et al. | |
| 6,760,003 B1 * | 7/2004 | Sase | 345/87 |
| 6,771,327 B2 | 8/2004 | Sekiguchi | |
| 6,845,578 B1 | 1/2005 | Lucas | |
| 6,859,907 B1 | 2/2005 | McGarry | |
| 2001/0026625 A1 | 10/2001 | Azima et al. | |
| 2002/0067373 A1 * | 6/2002 | Roe et al. | 345/762 |
| 2002/0091728 A1 | 7/2002 | Kjaer | |
| 2002/0093516 A1 | 7/2002 | Brunner et al. | |
| 2002/0163728 A1 | 11/2002 | Myers | |
| 2002/0163729 A1 | 11/2002 | Myers | |
| 2003/0069074 A1 | 4/2003 | Jackson | |
| 2003/0132895 A1 | 7/2003 | Berstis | |
| 2003/0184665 A1 | 10/2003 | Berstis | |
| 2004/0239582 A1 | 12/2004 | Seymour | |

FOREIGN PATENT DOCUMENTS

| | | | |
|---|---|---|---|
| AU | 24538/00 | | 8/2000 |
| AU | 68219/01 | | 12/2001 |
| BE | 1011678 | | 12/1999 |
| CA | 2009960 | | 9/1990 |
| CA | 2075807 | | 8/1991 |
| CA | 2139696 | | 7/1995 |
| CN | 1293805 | | 5/2001 |
| CN | 1294695 | | 5/2001 |
| DE | 2730785 | | 1/1979 |
| DE | 29912074 | | 12/1999 |
| DE | 19920789 | | 5/2000 |
| EP | 0389123 | | 9/1990 |
| EP | 0454423 | | 4/1991 |
| EP | 454423 | | 10/1991 |
| EP | 454423 | A1 * | 10/1991 |
| EP | 595387 | A | 10/1993 |
| EP | 662669 | | 1/1994 |
| EP | 0703563 | | 3/1996 |
| EP | 0802684 | | 10/1997 |
| EP | 0935191 | | 8/1999 |
| EP | 0999088 | | 5/2000 |
| EP | 1151430 | | 8/2000 |
| EP | 1177527 | | 11/2000 |
| EP | 1093008 | | 4/2001 |
| EP | 00950117.2 | | 8/2001 |
| EP | 1287401 | | 3/2003 |
| GB | 2145897 | | 4/1985 |
| GB | 2245092 | | 12/1991 |
| GB | 2312584 | | 10/1997 |
| GB | 2347003 | | 8/2000 |

| | | |
|---|---|---|
| GB | 2372618 | 8/2002 |
| IL | 93472 | 11/1994 |
| JP | 61248083 | 11/1986 |
| JP | 62-235929 | 10/1987 |
| JP | 63-65795 | 3/1988 |
| JP | 63-100898 | 5/1988 |
| JP | 63158587 | 7/1988 |
| JP | 1-229591 | 9/1989 |
| JP | 2-90127 | 3/1990 |
| JP | 2146087 | 6/1990 |
| JP | 3021902 | 3/1991 |
| JP | 3075963 | 3/1991 |
| JP | 3174580 | 7/1991 |
| JP | 3186894 | 8/1991 |
| JP | 3-226095 | 10/1991 |
| JP | 3226095 | 10/1991 |
| JP | 3282586 | 12/1991 |
| JP | 4191755 | 7/1992 |
| JP | 4220691 | 8/1992 |
| JP | 6-274305 | 9/1994 |
| JP | 6274305 | 9/1994 |
| JP | 6-314181 | 11/1994 |
| JP | 6317488 | 11/1994 |
| JP | 63-39299 | 12/1994 |
| JP | 7-44349 | 2/1995 |
| JP | 08-036375 | 2/1996 |
| JP | 8030243 | 2/1996 |
| JP | 8030388 | 2/1996 |
| JP | 8-83160 | 3/1996 |
| JP | 8095741 | 4/1996 |
| JP | 09-33858 | 2/1997 |
| JP | 9146751 | 6/1997 |
| JP | 11-205822 | 7/1997 |
| JP | 9-230825 | 9/1997 |
| JP | 09-282357 | 10/1997 |
| JP | 9308769 | 12/1997 |
| JP | 10039782 | 2/1998 |
| JP | 10039821 | 2/1998 |
| JP | 105829 | 4/1998 |
| JP | 10105829 | 4/1998 |
| JP | 10228347 | 8/1998 |
| JP | 10-260784 | 9/1998 |
| JP | 103355 | 10/1998 |
| JP | 10-334275 | 12/1998 |
| JP | 9308769 | 7/1999 |
| JP | 2000-142173 | 5/2000 |
| JP | 2000-347645 | 12/2000 |
| JP | 2001215332 | 8/2001 |
| JP | 2000-99237 | 10/2001 |
| JP | 2002-099223 | 4/2002 |
| JP | 2001-56675 | 9/2002 |
| JP | 2002-350772 | 12/2002 |
| JP | 2002-544544 | 12/2002 |
| JP | 2003-507774 | 2/2003 |
| NL | 1005868 | 10/1997 |
| NO | 20005178 | 4/2001 |
| NZ | PCT/NZ98/00098 | 7/1998 |
| NZ | PCT/NZ99/00021 | 9/1999 |
| PL | 343229 | 4/2001 |
| WO | 91/12554 | 8/1991 |
| WO | 96/27992 | 9/1996 |
| WO | WO 98/47106 | 10/1998 |
| WO | 99/42889 | 8/1999 |
| WO | WO 99/42889 | 8/1999 |
| WO | WO 9942889 A | 8/1999 |
| WO | 00/36578 | 6/2000 |
| WO | WO 00/36578 | 6/2000 |
| WO | 00/48167 | 8/2000 |
| WO | WO 00/48167 | 8/2000 |
| WO | 00/68887 | 11/2000 |
| WO | 01/01290 | 1/2001 |
| WO | 01/15127 | 3/2001 |
| WO | 01/15128 | 3/2001 |
| WO | WO 01/15128 | 3/2001 |
| WO | 01/95019 | 12/2001 |
| WO | WO 01/95019 | 12/2001 |
| WO | 02/35277 | 5/2002 |
| WO | 02/084637 | 10/2002 |
| WO | 02/091033 | 11/2002 |
| WO | WO 03/003109 A1 | 1/2003 |
| ZA | 9703025 | 11/1997 |

OTHER PUBLICATIONS

Office Action U.S. Appl. No. 10/048,966; Mail Date Sep. 18, 2007.
Office Action U.S. Appl. No. 10/049,271; Mail Date Feb. 5, 2008.
Office Action U.S. Appl. No. 10/049,271; Mail Date Aug. 5, 2008.
Office Action U.S. Appl. No. 10/049,272; Mail Date Aug. 13, 2008.
Office Action U.S. Appl. No. 10/049,272; Mail Date Dec. 24, 2008.
Office Action U.S. Appl. No. 10/528,334; Mail Date Feb. 24, 2009.
Office Action U.S. Appl. No. 10/528,334; Mail Date Aug. 5, 2008.
Final OA Dated Dec. 24, 2008; U.S. Appl. No. 10/049,272.
Final OA Dated Feb. 24, 2009; U.S. Appl. No. 10/528,334.
Final OA Dated Mar. 18, 2009; U.S. Appl. No. 10/049,966.
Translated Japanese Office Action Jul. 7, 2008—Provided to show relevance of the following references: JP 49-25387, JP 52-130340, JP 58-108574, JP 58-137880, JP 60-209781, JP 62-250477.
Non-Final Office Action Dated Aug. 14, 2009; U.S. Appl. No. 10/049,272.
Non-Final Office Action Dated Sep. 4, 2009; U.S. Appl. No. 10/476,590.
Non-Final Office Action Dated Sep. 1, 2009; U.S. Appl. No. 10/528,334.
Non-Final Office Action Dated Sep. 9, 2009; U.S. Appl. No. 10/557,157.
Non-Final Office Action Dated Aug. 12, 2009; U.S. Appl. No. 12/107,589.
U.S. Appl. No. 10/475,432, filed Sep. 23, 2004, Bell.
U.S. Appl. No. 10/476,590, filed Dec. 2, 2004, Seymour.
U.S. Appl. No. 10/048,638, filed Feb. 1, 2002, Engel.
U.S. Appl. No. 10/049,271, filed Feb. 6, 2002, Engel.
U.S. Appl. No. 10/049,272, filed Feb. 6, 2002, Engel.
U.S. Appl. No. 10/519,285, filed Oct. 26, 2005, Evanicky.
U.S. Appl. No. 10/521,413, filed Jul. 19, 2006, Engel.
U.S. Appl. No. 10/528,334, filed Mar. 13, 2006, Engel.
Harrison, et al., "Transparent Layered User Interfaces: An Evaluation of a Display Design to Enhance Focused and Divided Attention" ACM, 13 pages, 1995.
Ishii et al., "Iterative Design of Seamless Collaboration Media", Communications of the ACM, Aug. 1994, vol. 37, pp. 83-97.
Couter et al., Microsoft Office, 200 Prof. Ed., 1999, Sybex, Inc. pp. xxxi, 543 "Liquid Crystal Display" Ernst Lueder, Wily/SID Series in Display Technology.
http://www.textarc.org, 2002.
http://web.media.mit.edu/~ishii/TWS.html, 2002.
http://web.media.mit.edu/~ishii/CB.html, 2002.
International Search Report for PCT/NZ02/00073, Jul. 19, 2002.
International Search Report for PCT/NZ02/00079, Sep. 3, 2002.
International Search Report for PCT/NZ03/00132, Sep. 5, 2003.
International Search Report for PCT/NZ00/00143, Oct. 17, 2000.
International Search Report for PCT/NZ00/00160, Nov. 28, 2000.
International Search Report for PCT/NZ00/00161, Jan. 2, 2001.
International Search Report for PCT/NZ00/00162, Dec. 29, 2000.
International Search Report for PCT/NZ03/00153, Nov. 19, 2003.
International Search Report for PCT/NZ03/000215, Feb. 20, 2004.
"Textarc: An Alternate Way to View a Text," http://textarc.org, 2002.
"Textarc: NYSCA Grant and Public Installation," http//textarc.org, 2002.
"Textarc: The Print and the Artist," http://textarc.org, 2002.
Office Action U.S. Appl. No. 10/048,638, filed Jun.6, 2007.
Office Action U.S. Appl. No. 10/048,638, filed Jun. 26, 2006.
Office Action U.S. Appl. No. 10/048,638, filed Sep. 30, 2004.
Office Action U.S. Appl. No. 10/048,638, filed Oct. 17, 2005.
Office Action U.S. Appl. No. 10/048,638, filed Nov. 27, 2007.
Office Action U.S. Appl. No. 10/048,966, filed Jan. 12, 2006.
Office Action U.S. Appl. No. 10/048,966, filed Jan. 27, 2005.
Office Action U.S. Appl. No. 10/048,966, filed Mar. 15, 2006.
Office Action U.S. Appl. No. 10/048,966, filed May 2, 2007.
Office Action U.S. Appl. No. 10/048,966, filed May 3, 2006.
Office Action U.S. Appl. No. 10/048,966, filed Jul. 14, 2005.
Office Action U.S. Appl. No. 10/048,966, filed Aug. 18, 2006.

Office Action U.S. Appl. No. 10/049,271, filed Feb. 5, 2005.
Office Action U.S. Appl. No. 10/049,271, filed Feb. 8, 2006.
Office Action U.S. Appl. No. 10/049,271, filed Mar. 2, 2007.
Office Action U.S. Appl. No. 10/049,271, filed May 18, 2005.
Office Action U.S. Appl. No. 10/049,271, filed Aug. 23, 2006.
Office Action U.S. Appl. No. 10/049,271, filed Nov. 17, 2004.
Office Action U.S. Appl. No. 10/049,272, filed Jan. 23, 2006.
Office Action U.S. Appl. No. 10/049,272. filed Mar. 25, 2008.
Office Action U.S. Appl. No. 10/049,272, filed May 21, 2007.
Office Action U.S. Appl. No. 10/049,272, filed Jul. 13, 2005.
Office Action U.S. Appl. No. 10/049,272 filed Jul. 26, 2004.
Office Action U.S. Appl. No. 10/049,272, filed Aug. 28, 2006.
Office Action U.S. Appl. No. 10/049,272, filed Oct. 12, 2007.
Office Action U.S. Appl. No. 10/049,272, filed Nov. 29, 2004.
Office Action U.S. Appl. No. 10/049,272, filed Dec. 14, 2007.
Office Action U.S. Appl. No. 10/049,272, filed Dec. 31, 2003.
Office Action U.S. Appl. No. 10/489,101, filed Mar. 29, 2006.
Office Action U.S. Appl. No. 10/489,101, filed Jul. 16, 2007.
Office Action U.S. Appl. No. 10/489,101, filed Jul. 28, 2005.
Office Action U.S. Appl. No. 10/489,101, filed Nov. 22, 2005.
"Display", http://web.archive.org/web/20010717132509/http://whatis.techtarget.com/definition/0,,sid9_gci211965,00.html, Jul. 27, 2000.
Non-Final Office Action Dated Feb. 16, 2010; U.S. Appl. No. 12/107,589.
Final Office Action Dated Feb. 26, 2010; U.S. Appl. No. 10/476,590.
Final Office Action Dated Apr. 15, 2010; U.S. Appl. No. 10/557,157.
Final Office Action Dated Jun. 25, 2010; U.S. Appl. No. 12/107,589.
Non-Final Office Action Mailed Sep. 13, 2010; U.S. Appl. No. 12/606,728.
Non-Final Office Action Mailed Oct. 22, 2010; U.S. Appl. No. 12/107,589.
Non-Final Office Action Mailed Oct. 12, 2010; U.S. Appl. No. 10/557,157.
Final Office Action Dated Apr. 26, 2011; U.S. Appl. No. 10/557,157.
Final Office Action dated Mar. 21, 2011; U.S. Appl. No. 12/107,589.
Office Action Dated Feb. 8, 2011; U.S. Appl. No. 12/606,728.
Notice of Allowance Dated Jul. 29, 2011; U.S. Appl. No. 10/557,157.

* cited by examiner

INFORMATION DISPLAY

This application claims priority from International Application Serial Number PCT/NZ02/00079 having an International Filing Date of 01 May 2002 and a Priority Date of 01 May 2001.

TECHNICAL FIELD

The present invention relates generally to an information display and more specifically to multi focal plane information displays and a method of enhancing information extraction from same.

BACKGROUND ART

Any potential improvements in the input speed, comprehension and/or retention of information gained via reading would be clearly beneficial to a wide spectrum of users in many diverse applications.

It is believed that use may be made of the readers subconscious to enhance the recognised conscious reading mechanisms typically employed during the reading of books, computer screens, visual displays and so forth. Current means of increasing the quantity of information available to the reader have largely involved decreasing the font size to provide a greater quantity of text surface area. However, this technique fails to overcome the inherent limitations of the human eye, i.e. reducing the text font size below a certain level causes a significant reduction in readability.

Menus, layering, pop-up windows and so forth have been used single focal plane prior art displays as alternative means of enhancing the quantity of information available to the reader without making the display overly cluttered.

Although the use of menus and similar hierarchical display methods do enable the user to access the required information without the need for large display surfaces or undue display clutter, they reduce the viewer's situational awareness. Moreover, they require positive interaction by the user, which is not always practical or desirable and are unavoidably slower to use than continuously displayed information.

Multi-layer or multi-focal plane displays have been utilised to address the above difficulties whereby two or more display screens at least partially overlap, displaying information in two or more distinct focal planes. The viewer may thus focus on the individual screens to view the information displayed thereon without accessing a menu or needing to make significant head/eye movements to scan large display surfaces.

Research such as the *Transparent Layered User Interfaces: An Evaluation of a Display Design to Enhance Focused and Divided Attention*, Harrison et al, *CHI 95 Conference* (1995) examined the link of transparent displays on focused and/or divided attention.

Examples of focused attention include a computer software dialog box or warning message interrupting a user concentrating on a document, or part of a display screen being temporarily obscured by a drop-down menu.

Divided attention examples provided by Harrison et al include using a video display showing a colleague during collaborative work, were the participant's attention is shared between the colleague and the work in progress, e.g., a drawing or document.

Harrison et al considered cases of individuals needing to time-share two information items or 'tasks' (divided attention), and cases were individuals selectively attend to one task excluding the other (focused attention). However, no specific exploration is made of the potential benefit of the unfocused information item on an individual focusing on another information item/task.

Various means of simultaneously displaying and analysing large literary text is disclosed at the TextArc™ website http://textarc.org (15 Apr. 2002). The display techniques employed are highly unusual and innovative. In one embodiment, the entire text of a novel for example, is arranged in concentric spirals. Each successive line of the novel is written in miniature around the outside of the spiral, with frequently occurring words also being displayed in a larger font within the spiral arc. The frequency of occurrence within the document is denoted by the word's intensity or luminance, while its location is determined by the mean geometrical position between occurrences about the outer spiral. Additional displays of the text in a conventional form may be overlaid on the spiral arc representation, enhancing the pre-attentive possibilities for the viewer. As the viewer scrolls through the conventional text, the high frequency words are illuminated within the spiral, together with radial lines extending to each point in the spiral containing the word.

A viewer may thus see a measure of a word's significance, its interconnection to other words and its effective location within a document. The viewer is thus presented with exposure to the bottom up structure of the entire document and to a variety of interrelationships between the contents.

However, the combined/overlapping display obscures a portion of the text spiral arrangement. Furthermore, the sheer wealth of visual input in one focal plane may be distracting and hinder preattentive intake by the viewer.

Further prior art work by Ishii H et al, "Iterative Design of Seamless Collaboration Media", Communications of the ACM (CACM), ACM, Vol 37, No. 8, Aug. 1994, and the work described at the web sites http://web.media.mit.edu/~ishii/TWS.html, and http://web.media.mit.edu/~ishii/CB.html by the same authors discusses combination computer display/whiteboard-type transparent displays. The issue addressed by Ishii et al is creating a usable work space environment combining the benefits of a computer screen interface, a physical desktop and a dual sided transparent glass-board. The resultant system provides a display surface on which the images of collaborative workers appear to face the user whilst any text/drawing written by any of the collaborators/users automatically appears with the correct orientation on the combined display. This overcomes the problem of inversion caused by collaborating users writing on opposing sides of a common transparent panel. The meaning of facial gestures and body language nuances of the collaborators regarding particular items in the workspace screen may be easily discerned. However, again the display surface is essentially a single focal plane and thus does not take full advantage of the preattentive depth-related capabilities of the user, as described below.

The benefits of multi-layered viewing screens, in particular those utilising the technology described in the co-pending Patent Application Nos. NZ314566, NZ328074, NZ329130, PCT/NZ98/00098 and PCT/NZ99/00021 are gaining increasingly widespread recognition and acceptance due to their enhanced capabilities compared to conventional single focal plane displays.

The basic principle of known multi-focal plane displays is that the viewer consciously applies their attention to one of the focal planes individually or to a composite image found by the combination of images displayed on at least partially transparent screens.

Therefore, although the viewing experience may be enriched by the potential sense of depth provided by such composite displays, it has not been utilised thus far as a means of enhancing the reading/image assimilation speed of the viewer, nor of using the information displayed on one focal plane to improve the net effect on a user consciously viewing the display on a separate focal plane. Such improved effects could include improvements in comprehension, perception, retention, recall, interpretation and/or association with related information.

The manner in which human beings process visual information has been the subject of extensive and prolonged research in an attempt to understand this complex process. The term preattentive processing has been coined to denote the act of the subconscious mind in analysing and processing visual information which has not become the focus of the viewer's conscious awareness.

When viewing a large number of visual elements, certain variations or properties in the visual characteristics of elements can lead to rapid detection by preattentive processing.

This is significantly faster than requiring a user to individually scan each element, scrutinising for the presence of the said properties. Exactly what properties lend themselves to preattentive processing has in itself been the subject of substantial research. Colour, shape, three-dimensional visual clues, orientation, movement and depth have all been investigated to discern the germane visual features that trigger effective preattentive processing.

Researchers such as Triesman [1985] conducted experiments using target and boundary detection in an attempt to classify preattentive features. Preattentive target detection was tested by determining whether a target element was present or absent within a field of background distractor elements. Boundary detection involves attempting to detect the boundary formed by a group of target elements with a unique visual feature set within distractors. It maybe readily visualised for example that a red circle would be immediately discernible set amongst a number of blue circles. Equally, a circle would be readily detectable if set amongst a number of square shaped distractors. In order to test for preattentiveness, the number of distractors as seen is varied and if the search time required to identify the targets remains constant, irrespective of the number of distractors, the search is said to be preattentive. Similar search time limitations are used to classify boundary detection searches as preattentive.

A widespread threshold time used to classify preattentiveness is 200-250 msec as this only allows the user opportunity for a single 'look' at a scene. This timeframe is insufficient for a human to consciously decide to look at a different portion of the scene. Search tasks such as those stated above maybe accomplished in less than 200 msec, thus suggesting that the information in the display is being processed in parallel unattendedly or pre-attentively.

However, if the target is composed of a conjunction of unique features, i.e. a conjoin search, then research shows that these may not be detected preattentively. Using the above examples, if a target is comprised for example, of a red circle set within distractors including blue circles and red squares, it is not possible to detect the red circle preattentively as all the distractors include one of the two unique features of the target.

Whilst the above example is based on a relatively simple visual scene, Enns and Rensink [1990] identified that targets given the appearance of being three-dimensional objects can also be detected preattentively. Thus, for example a target represented by a perspective view of a cube shaded to indicate illumination from above would be preattentively detectable amongst a plurality of distractor cubes shaded to imply illumination from a different direction. This illustrates an important principle in that the relatively complex, high-level concept of perceived three-dimensionality may be processed preattentively by the sub-conscious mind. In comparison, if the constituent elements of the above-described cubes are re-orientated to remove the apparent three dimensionality, subjects cannot preattentively detect targets which have been inverted for example. Additional experimentation by Brown et al [1992] confirms that it is the three-dimensional orientation characteristic that is preattentively detected. Nakaymyama and Silverman [1986] showed that motion and depth were preattentive characteristics and that furthermore, stereoscopic depth could be used to overcome the effects of conjoin. This reinforced the work done by Enns Rensink in suggesting that high-level information is conceptually being processed by the low-level visual system of the user. To test the effects of depth, subjects were tasked with detecting targets of different binocular disparity relative to the distractors. Results showed a constant response time irrespective of the increase in distractor numbers.

These experiments were followed by conjoin tasks whereby blue distractors were placed on a front plane whilst red distractors were located on a rear plane and the target was either red on the front plane or blue on the rear plane for stereo colour (SC) conjoin tests, whilst stereo and motion (SM) trials utilised distractors on the front plane moving up or on the back plane moving down with a target on either the front plane moving down or on the back plane moving up.

Results showed the response time for SC and SM trials were constant and below the 250 msec threshold regardless of the number of distractors. The trials involved conjoin as the target did not possess a feature unique to all the distractors. However, it appeared the observers were able to search each plane preattentively in turn without interference from distractors in another plane.

This research was further reinforced by Melton and Scharff [1998] in a series of experiments in which a search task consisting of locating an intermediate-sized target amongst large and small distractors tested the serial nature of the search whereby the target was embedded in the same plane as the distractors and the preattentive nature of the search whereby the target was placed in a separate depth plane to the distractors.

The relative influence of the total number of distractors present (regardless of their depth) verses the number of distractors present solely in the depth plane of the target was also investigated. The results showed a number of interesting features including the significant modification of the response time resulting from the target presence or absence. In the target absence trials, the reaction times of all the subjects displayed a direct correspondence to the number of distractors whilst the target present trials did not display any such dependency. Furthermore, it was found that the reaction times in instances where distractors were spread across multiple depths were faster than for distractors located in a single depth plane.

Consequently, the use of a plurality of depth/focal planes as a means of displaying information can enhance preattentive processing with enhanced reaction/assimilation times.

It is thus believed that a means of overcoming the above described drawbacks is available by harnessing the peripheral vision and subconscious perception of the reader (particularly in conjunction with multi focal plane displays) to assimilate additional information sources simultaneously with the process of conventional reading in order to enhance the speed and effectiveness of the whole reading/viewing process.

The benefits of the multi-layered viewing screens, in particular those utilising the technology described in the co-pending Patent Application Nos. NZ314566, NZ328074, NZ329130, PCT/NZ98/00098 and PCT/NZ99/00021 are especially germane to displays using liquid crystal displays (LCD).

There are two main types of Liquid Crystal Displays used in computer monitors, passive matrix and active matrix. Passive-matrix Liquid Crystal Displays use a simple grid to supply the charge to a particular pixel on the display. Creating the grid starts with two glass layers called substrates. One substrate is given columns and the other is given rows made from a transparent conductive material. This is usually indium tin oxide. The rows or columns are connected to integrated circuits that control when a charge is sent down a particular column or row. The liquid crystal material is sandwiched between the two glass substrates, and a polarizing film is added to the outer side of each substrate.

A pixel is defined as the smallest resolvable area of an image, either on a screen or stored in memory. Each pixel in a monochrome image has its own brightness, from 0 for black to the maximum value (e.g. 255 for an eight-bit pixel) for white. In a colour image, each pixel has its own brightness and colour, usually represented as a triple of red, green and blue intensities. To turn on a pixel, the integrated circuit sends a charge down the correct column of one substrate and a ground activated on the correct row of the other. The row and column intersect at the designated pixel and that delivers the voltage to untwist the liquid crystals at that pixel.

The passive matrix system has significant drawbacks, notably slow response time and imprecise voltage control. Response time refers to the Liquid Crystal Displays ability to refresh the image displayed. Imprecise voltage control hinders the passive matrix's ability to influence only one pixel at a time. When voltage is applied to untwist one pixel, the pixels around it also partially untwist, which makes images appear fuzzy and lacking in contrast.

Active-matrix Liquid Crystal Displays depend on thin film transistors (TFT). Thin film transistors are tiny switching transistors and capacitors. They are arranged in a matrix on a glass substrate. To address a particular pixel, the proper row is switched on, and then a charge is sent down the correct column. Since all of the other rows that the column intersects are turned off, only the capacitor at the designated pixel receives a charge. The capacitor is able to hold the charge until the next refresh cycle. And if the amount of voltage supplied to the crystal is carefully controlled, it can be made to untwist only enough to allow some light through. By doing this in very exact, very small increments, Liquid Crystal Displays can create a grey scale. Most displays today offer 256 levels of brightness per pixel.

A Liquid Crystal Display that can show colours must have three subpixels with red, green and blue colour filters to create each colour pixel. Through the careful control and variation of the voltage applied, the intensity of each subpixel can range over 256 shades. Combining the subpixel produces a possible palette of 16.8 million colours (256 shades of red×256 shades of green×256 shades of blue).

Liquid Crystal Displays employ several variations of liquid crystal technology, including super twisted nematics, dual scan twisted nematics, ferroelectric liquid crystal and surface stabilized ferroelectric liquid crystal. They can be lit using ambient light in which case they are termed as reflective, backlit and termed Transmissive, or a combination of backlit and reflective and called transflective. There are also emissive technologies such as Organic Light Emitting Diodes, and technologies which project an image directly onto the back of the retina which are addressed in the same manner as Liquid Crystal Displays. These devices are described hereafter as LCD panels All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications are referred to herein, this reference does not constitute an admission that any of these documents form part of the common general knowledge in the art, in New Zealand or in any other country.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

It is an object of the present invention to address the foregoing problems or at least to provide the public with a useful choice.

Further aspects and advantages of the present invention will become apparent from the ensuing description which is given by way of example only.

DISCLOSURE OF INVENTION

According to one aspect of the present invention there is provided a method displaying information for viewing by a user characterised by the steps of:

a) displaying primary information on a first focal plane, and b) displaying secondary information on at least a second focal plane peripherally to said primary information, wherein said secondary information exhibits at least one characteristic capable of augmenting the effect of the primary information on the user.

As used herein, the primary information and secondary information may be comprised of alpha-numeric characters, symbols, plain text, images, animations, video sequences, a combination of same and any other means of visually representing information.

The terms primary and secondary information are not defined to infer or necessarily suggest any hierarchical relationship or degree of relative importance between the primary and secondary information. Rather, the term primary information is simply denotes the information being viewed directly by the user and being interpreted by normal conscious thought processes associated with reading or viewing images.

The said effect of the secondary information on a user viewing the primary information may include, but is not limited to:

an improved assimilation of the content or message contained by the primary information, including reading and/or comprehension speed;

an enhanced ability to perceive embedded, implied or related facts (directly or indirectly), links, nuances, innuendoes or associations regarding the primary information;

a greater understanding and comprehension of the primary information;

improved retention and latent recall of the primary information;

more enjoyment than experienced by viewing the primary information in isolation.

The said augmenting effect on a user may be achieved by, displaying the secondary information on multiple focal planes, with substantially the same content and format as the primary information;

displaying the secondary information on multiple focal planes, with substantially the same content in a different format and/or visual appearance to the primary information;

displaying one of either the primary or secondary information on a rearward display screen before or after displaying the other of said primary or secondary information on a forward display screen.

the application of variable format to either or both of said primary or secondary information including, but not limited to speed, colour, repetition, visual effects, motion, looming, scrolling, blinking, fading and/or size change.

the static use of format including but not limited to speed, colour, repetition, visual effects, motion, looming, scrolling, blinking, fading and size change applied to either or both primary and/or secondary information.

displaying graphics/images as at least part of said secondary information capable of eliciting a priming, pre-fetching, anticipating, associating or triggering response by a viewer viewing the primary information.

any and all combinations and/or permutations of the above.

According to a further aspect of the present invention, there is provided a multi-focal plane display including at least two at least partially overlapping display surfaces, capable of displaying Information according to the above-described method.

Thus, while prior research has included three attentional components, i.e., an individual's capacity to divide attention between two items, the ability to focus on any single item with minimal interference from other items and the recovery time/latency involved in shifting attention between items, these fail to address the potential advantage/benefit of subconscious information assimilation during focused or divided attention activity.

The present invention may also incorporate existing technological applications displaying primary and secondary information, presently directed to use in single focal plane displays and/or wherein said secondary information lacks at least one characteristic capable of augmenting the effect of the primary information on the user.

Thus, according to a further aspect of the present invention, one of said primary or secondary information includes simultaneously displaying all or a substantial portion of a written work on either of said first and second focal planes.

Preferably, said written work is composed of text arranged in an enclosing geometric pattern, preferably a concentric spiral (e.g., as shown in FIG. 2).

In one embodiment, recurring text items are displayed individually at a mean geometrical position between occurrences of the text item about the concentric spiral.

In a further embodiment, the text item frequency of occurrence document in the written work is denoted by a corresponding variation in intensity or luminance of the text item Preferably, the other of said primary or secondary information includes displaying a portion of said written work.

As the viewer scrolls through the conventional text, the high frequency words are illuminated within the spiral, together with radial lines extending to each point in the spiral containing the word.

BRIEF DESCRIPTION OF DRAWINGS

Further aspects of the present invention will become apparent from the following description which is given by way of example only and with reference to the accompanying drawings in which.

BEST MODES FOR CARRYING OUT THE INVENTION

Figure 1:
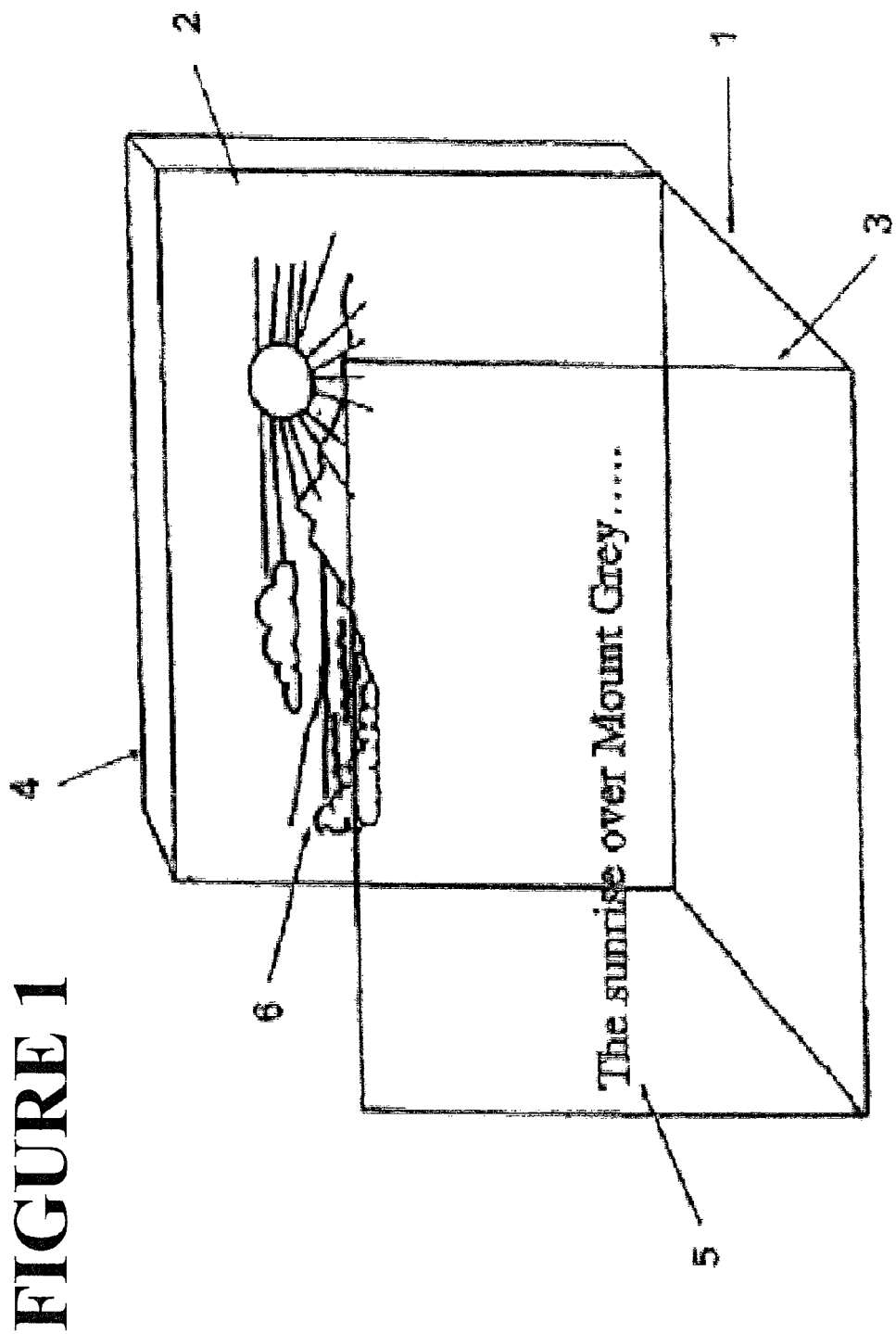
FIG. 1 shows a simplified perspective view of a dual screen display operating in accordance with a preferred embodiment of the present invention.
Figure 2:
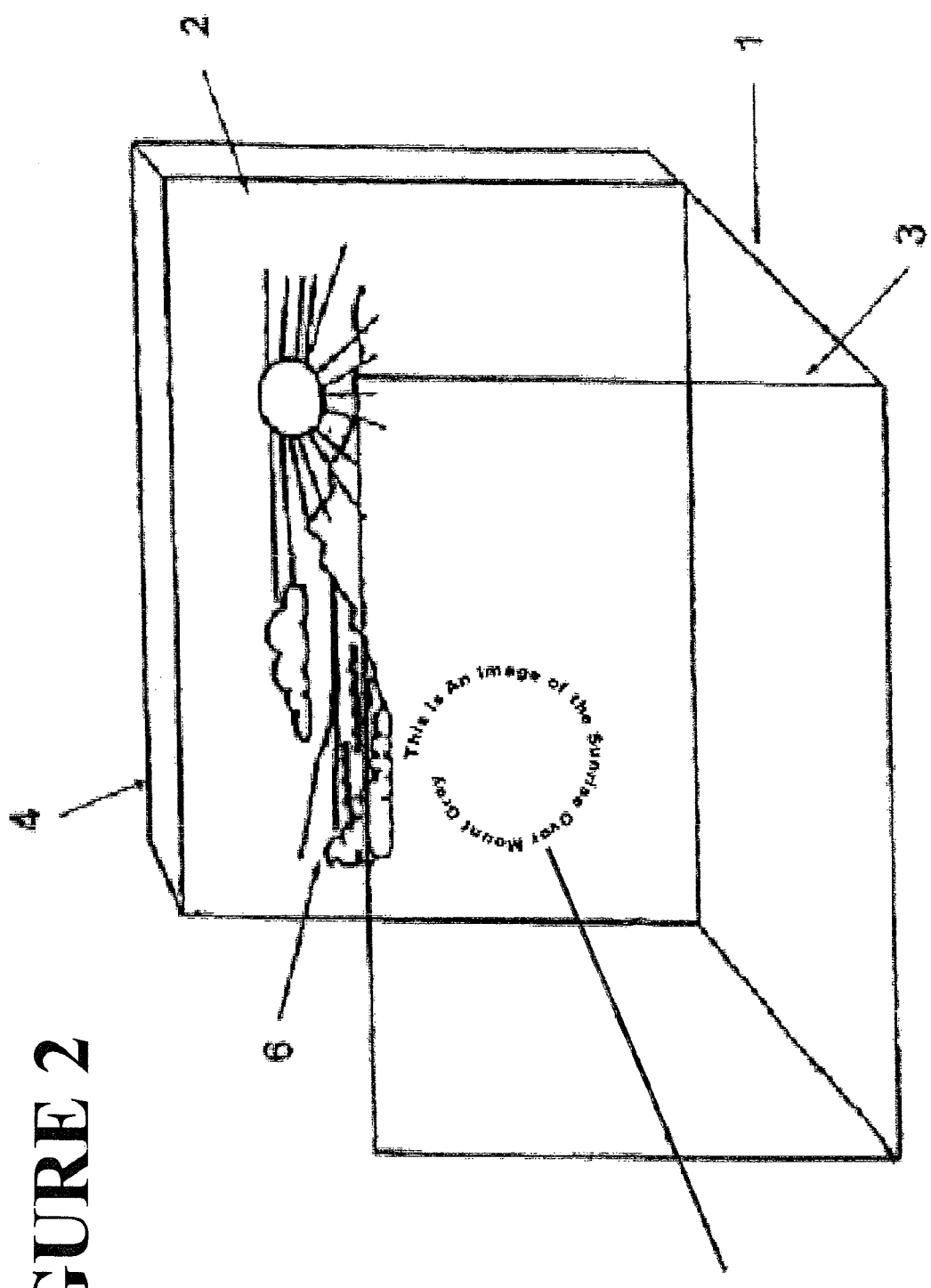
FIG. 2 shows a simplified perspective view of a dual screen display operating in accordance with another preferred embodiment of the present invention.
Figure 3:
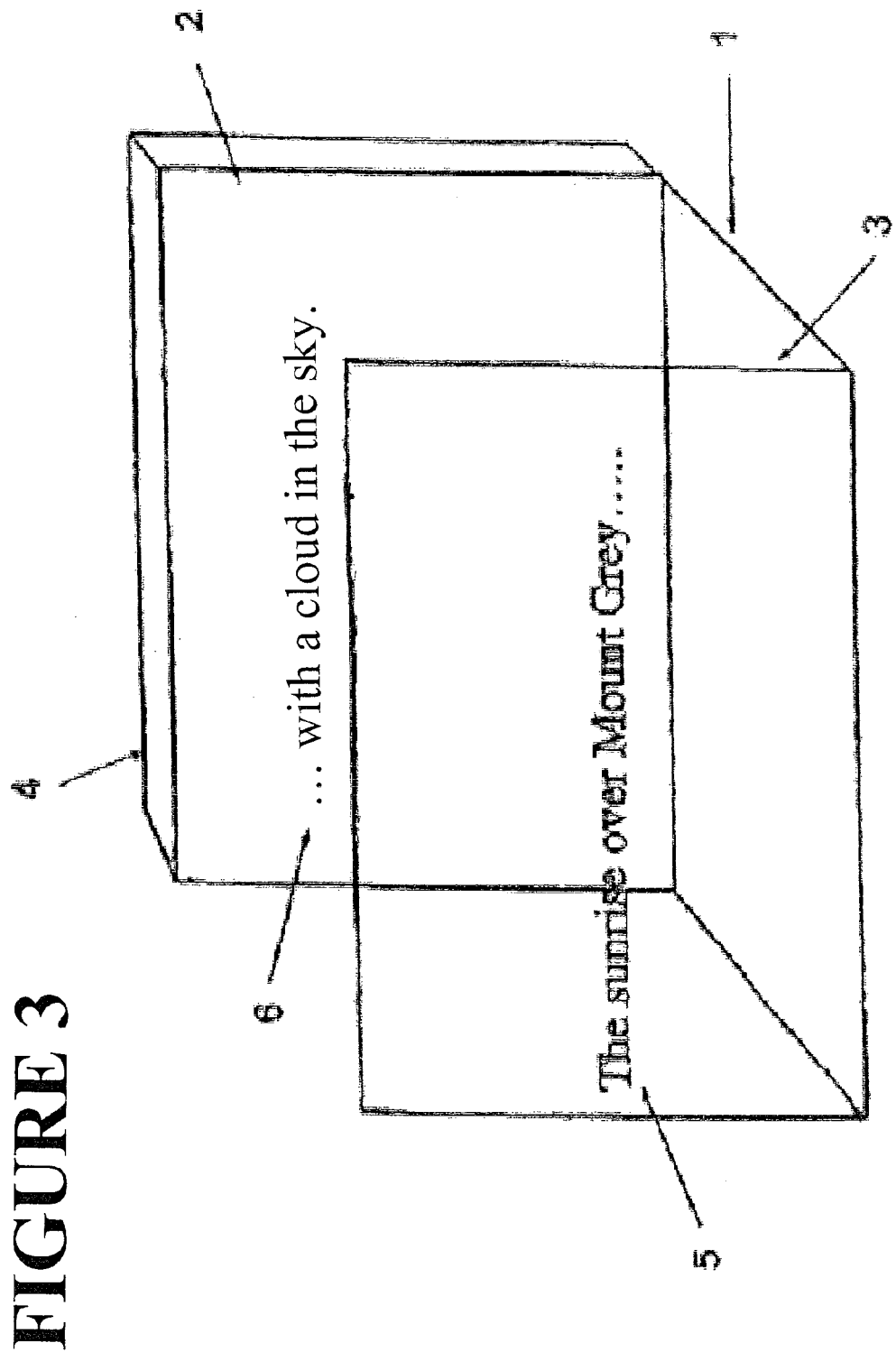
FIG. 3 shows a simplified perspective view of a dual screen display operating in accordance with yet another preferred embodiment of the present invention.

FIGS. 1, 2 and 3 each show a multi focal plane display operating in accordance with a preferred embodiment of the present invention. The display indicated by the general reference numeral (1) is preliminary comprised of a background screen (2) orientated parallel with, but spaced apart from a foreground screen (3). In one embodiment, both screens (2,3) are transparent liquid crystal displays LCD panels though the invention is not necessarily limited to same. A back-light (4) may be located behind the rearward screen (2) to provide illumination for the whole display (1).

The display screens (2,3) are each capable of displaying either primary (5) or secondary (6) information. For example, FIGS. 1, 2 and 3 each show primary information (5) displayed on the forward screen (3) and secondary information (6) displayed on the rearward screen (2). It will be appreciated that the converse situation is equally feasible; for example, the primary information (5) may be displayed on the rearward screen (2) and vice versa. The primary information (5) and secondary information (6) may both be comprised of any form of text, symbols, alphanumeric characters, animations and so forth. However, the content of the secondary information (6) is such that a user viewing the primary information (5) on the forward screen (3) would receive a beneficial affect due to some enhancing or augmenting quality of the secondary information (6). This enhancing quality may take many forms and these include, but are not limited to an increased reading and/or comprehension speed of the primary information (5), a greater retention, perception of related information and so forth.

For example, as shown in FIG. 1, an information passage describing a geographical location written in conventional text on the forward screen (3) the primary information (5) in the form of being read by a user would fall within the definition of the primary information (5) in that the information would be the focus of the viewers conscious reading actions and occupying their direct attention. A representation of the content of the primary information (5) may be shown concurrently in graphical form on the rearward screen (2) as the secondary information (6). This exemplary scenario is illustrated in FIG. 1 whereby the primary information (5) is a text passage describing the sunrise over a particular mountain feature and the secondary information provides a visual representation of the actual mountain and rising sun. The location of the rearward screen (2) in a second focal plane behind that of the primary information on the forward screen (3) may provide a peripheral, subconscious awareness of the content of the secondary information to the user viewing the primary information (5).

The user will therefore experience a greater sense of the actual physical shape and surroundings to the feature described in the textual description(s) on the forward screen (3) enhancing their reading experience.

FIG. 3 shows a first portion of text (e.g., 5) displayed on a first display screen (e.g., 3) and a second portion of text (e.g., 6) on a second display screen (e.g., 2). Such a display of text may be used as an alternative technique to enhance the reading speed of a user in one embodiment. The first portion of text may be the primary information (e.g., 5) displayed on the forward screen (e.g., 3), while the second portion of text may be the secondary information displayed on the rearward screen (e.g., 2). Additionally, the second portion of text (e.g., displayed on display screen 2) may be a next section of text to be read after the first portion of text (e.g., displayed on display screen 3) in one embodiment. The secondary information (e.g., 6) may thus pre-fetch the text about to be read by the user and thus may prime the user's subconscious to be more receptive and aware of its content. It is believed that this subconscious imbibing of the additional text increases the quantity of information accessible by the mind and ultimately increases the reading speed and comprehension of the whole message.

Instead of displaying the secondary information (6) simultaneously with the primary information (5), it may alternatively be shown slightly before or after displaying the primary information (5) respectively providing a pre-conditioning or re-enforcing effect on the user reading the primary information (5). It will be apparent to those skilled in the art that many variations and permutations are possible regarding the content of the primary and secondary information (5, 6), the focal plane location/orientation of their respective displays (2,3), and the manner of displaying the primary and secondary information (5,6,) without departing from the scope and spirit of the invention.

It will be equally apparent that the invention need not necessarily be comprised of information shown on exactly two liquid crystal displays, provided that the effect of viewing the primary information (5) (displayed in whatever form) is augmented by the peripheral assimilation of the secondary information (6) being displayed on one or more focal planes distinct from the primary information (5).

Aspects of the present invention have been described by way of example only and it should be appreciated that modifications and additions may be made thereto without departing from the scope thereof.

The invention claimed is:

1. A method of displaying information on a display device, said method comprising:
 displaying a first image on a first display screen of said display device, wherein said first image comprises a first portion of text;
 displaying a second image on a second display screen of said display device, wherein said second image is related to said first image, and wherein said first and second display screens overlap; and
 responsive to a user input, displaying a third image on said first display screen of said display device, wherein said third image comprises a second portion of text associated with said first portion of text,
 wherein said user input is associated with scrolling through a written work.

2. The method of claim 1, wherein said first and second display screens are physically spaced apart from one another.

3. The method of claim 1, wherein said first and second images are related to a subject matter.

4. The method of claim 3, wherein said subject matter is selected from a group consisting of a landmark, a place, a person, and an object.

5. The method of claim 1, wherein said displaying said first image further comprises displaying said first image simultaneously with said displaying said second image.

6. The method of claim 1, wherein said first and second images are displayed sequentially.

7. The method of claim 1, wherein said first image is selected from a group consisting of animated content and a still image.

8. The method of claim 1, wherein said second image is selected from a group consisting of animated content and a still image.

9. The method of claim 1, wherein said third image is selected from a group consisting of animated content and a still image.

10. The method of claim 1, wherein said second image is selected from a group consisting of a symbol, a character, an icon, and text.

11. The method of claim 1, wherein said second image is a graphical representation of said first portion of text.

12. The method of claim 1, wherein said second image is a graphical representation of said second portion of text.

13. The method of claim 1, wherein said displaying said first image further comprises displaying said first image with a display characteristic selected from a group consisting of a moving, rotating, scrolling, flashing, adjusting a transparency, adjusting a color, adjusting a shape, and adjusting a size.

14. The method of claim 1, wherein said displaying said second image further comprises displaying said second image with a display characteristic selected from a group consisting of a moving, rotating, scrolling, flashing, adjusting a transparency, adjusting a color, adjusting a shape, and adjusting a size.

15. The method of claim 1, wherein said displaying said third image further comprises displaying said third image with a display characteristic selected from a group consisting of a moving, rotating, scrolling, flashing, adjusting a transparency, adjusting a color, adjusting a shape, and adjusting a size.

16. A display device comprising:
 a first display screen operable to display a first image, wherein said first image comprises a first portion of text; and
 a second display screen operable to display a second image, wherein said second image is related to said first image, and wherein said first and second display screens overlap, and
 wherein said first display screen is further operable to display, responsive to a user input, a third image, wherein said third image comprises a second portion of text associated with said first portion of text,
 wherein said user input is associated with scrolling through a written work.

17. The display device of claim 16, wherein said first and second display screens are physically spaced apart from one another.

18. The display device of claim 16, wherein said first and second images are related to a subject matter.

19. The display device of claim 18, wherein said subject matter is selected from a group consisting of a landmark, a place, a person, and an object.

20. The display device of claim 16, wherein said first and second images are displayed simultaneously.

21. The display device of claim 16, wherein said first and second images are displayed sequentially.

22. The display device of claim 16, wherein said first image is selected from a group consisting of animated content and a still image.

23. The display device of claim 16, wherein said second image is selected from a group consisting of animated content and a still image.

24. The display device of claim 16, wherein said third image is selected from a group consisting of animated content and a still image.

25. The display device of claim 16, wherein said second image is selected from a group consisting of a symbol, a character, an icon, and text.

26. The display device of claim 16, wherein said second image is a graphical representation of said first portion of text.

27. The display device of claim 16, wherein said second image is a graphical representation of said second portion of text.

28. The display device of claim 16, wherein said first display screen is further operable to display said first image with a display characteristic selected from a group consisting of a moving, rotating, scrolling, flashing, adjusting a transparency, adjusting a color, adjusting a shape, and adjusting a size.

29. The display device of claim 16, wherein said second display screen is further operable to display said second image with a display characteristic selected from a group consisting of a moving, rotating, scrolling, flashing, adjusting a transparency, adjusting a color, adjusting a shape, and adjusting a size.

30. The display device of claim 16, wherein said first display screen is further operable to display said third image with a display characteristic selected from a group consisting of a moving, rotating, scrolling, flashing, adjusting a transparency, adjusting a color, adjusting a shape, and adjusting a size.

* * * * *